United States Patent [19]

Boscan-Romero et al.

[11] Patent Number: 5,194,301

[45] Date of Patent: Mar. 16, 1993

[54] PROCESS FOR REDUCING SCALE FORMATION IN VINYL POLYMERIZATION REACTORS

[75] Inventors: Neida C. Boscan-Romero; Jose L. Corcuera-Casas; Edgar R. Gonzalez-Acevedo; Enrique J. Millan-Barrios; Rafael A. Quintero-Arcaya, all of Maracaibo, Venezuela

[73] Assignee: Investigacion y Desarrollo, C.A., El Tablazo, Venezuela

[21] Appl. No.: 795,160

[22] Filed: Nov. 20, 1991

Related U.S. Application Data

[63] Continuation-in-part of Ser. No. 565,075, Aug. 9, 1990, Pat. No. 5,139,823.

[51] Int. Cl.$^5$ .......................... B01J 1/20; B05D 7/22; C08F 2/00
[52] U.S. Cl. ..................... 427/237; 422/131; 422/241; 427/230; 427/233; 427/239; 427/314; 427/315; 427/318; 526/62; 526/74; 526/344
[58] Field of Search ............... 427/237, 230, 315, 239, 427/318, 233, 314; 422/131, 241; 526/62, 74, 344

[56] References Cited

U.S. PATENT DOCUMENTS

| | | | |
|---|---|---|---|
| 4,080,173 | 3/1978 | Cohen | 427/230 |
| 4,200,712 | 4/1980 | Cohen | 427/230 |
| 4,228,130 | 10/1980 | Cohen | 427/230 |
| 4,256,864 | 3/1981 | Cohen | 526/62 |
| 4,263,421 | 4/1981 | Jones | 427/230 |
| 4,579,864 | 4/1986 | Dorsch et al. | 428/35 |
| 4,622,245 | 11/1986 | Shimizu et al. | 427/230 |

FOREIGN PATENT DOCUMENTS 1181899 1/1985 Canada .
54-107991 8/1979 Japan .

*Primary Examiner*—Janyce Bell
*Attorney, Agent, or Firm*—Pennie & Edmonds

[57] ABSTRACT

The present invention refers to a process for inhibiting the formation of polymer buildup on the inner surfaces of a vinyl polymerization reactor by coating such surfaces with an alkaline solution of a linear or branched low molecular weight compound belonging to the poly(hydroxybenzyl) and poly(hydroxybenzylether) families and including their copolymers or blends. This process effectively reduces the adherence of polymeric material to the inner parts of the reaction vessel wherein substituted ethylene monomers are polymerized.

20 Claims, No Drawings

PROCESS FOR REDUCING SCALE FORMATION IN VINYL POLYMERIZATION REACTORS

CROSS-REFERENCE TO RELATED APPLICATIONS

This application is a continuation-in-part of application Ser. No. 07/565,075 filed Aug. 9, 1990, now U.S. Pat. No. 5,139,823.

BACKGROUND OF THE INVENTION

The present invention refers to a process for inhibiting the formation of polymer buildup on the inner surfaces of polymerization reactors by coating such surfaces with an alkaline solution of a linear or branched poly(hydroxybenzyl) compound, poly(hydroxybenzylether) compound, or copolymers or mixtures thereof.

In the industrial production of vinyl polymers, a great variety of chemical processes are used. Those which are particularly relevant to our invention include suspension, dispersion, microsuspension and emulsion processes. In those processes, the reaction medium consists mainly of: water, suspension agents, dispersants or emulsifiers (depending on the case) and one or several substituted monomers of ethylene (which are typically insoluble in water).

Depending on how stable the heterogeneous and discontinuous medium is, vigorous shaking or other kind of agitation is needed to keep apart the small entities of monomer where the chemical transformation is to be carried out. Given the instabilities associated with the heterogeneous medium, the imperfections in the homogenizing flux pattern, those of the temperature transfer system, or the irregularities in the topography of the reactor walls, some polymer particles may tend to separate from the bulk of the solution and to adhere to the inner surfaces of the reactor. As this polymer remains adhered during several reaction cycles, it can cross-link (form a polymer of larger molecular weight than the initial one), and serve as a seed for gradual accumulation of more polymeric material.

The adherence of polymeric material to the walls of a reaction vessel, as well as to the stirring accessories (rods, flux-breakers, etc.), can reduce the quality of the polymer being prepared. Such adhered material affects the process in several ways: it reduces thermal conduction between the heat transfer system and the reaction medium, it affects the homogenizing performance of the mixing elements by modifying their effective shapes and sizes, and it alters the optical and mechanical properties of the final product when it peels off the walls and passes to the polymer bulk, since such granules are substantially harder and less porous than the normal polymer. In addition, it is necessary to minimize the generation of the amount of scale since: 1) its removal causes extra down-time and consequently a deceleration of production, and 2) the opening of the reactor for its proper cleaning (mechanical and/or with pressurized water), allows the release of the monomer to the plant surroundings, which hinders maintaining monomer concentration within the limits established by environmental protection and industrial safety regulations.

Several patents have been granted for coating polymerization reactors in order to prevent the accumulation of polymer on their surfaces, among which are U.S. Pat. No. 4,256,864, which describes the application of an aqueous solution of a complex resulting from mixing a hydrophilic uncross-linked polymer (as poly(vinyl alcohol) or hydroxypropyl methyl cellulose) with an inhibitor such as disodium salt of bisphenol A or glucose thiosemicarbazone; U.S. Pat. No. 4,579,758, in which the base substance for the coating is an oligomer obtained from the condensation of benzaldehyde and resorcinol; U.S. Pat. No. 4,622,245, which utilizes as a surface coating the blend of a polymeric compound which contains hydroxyl groups (such as polyvinyl alcohol) and a derivative of salicylic acid; U.S. Pat. No. 4,200,712 which employs as the primary substance a product of the condensation of an alkyl or halogenated phenol; U.S. Pat. No. 4,263,421 where the coating is applied by means of vinyl chloride in vapor form; U.S. Pat. Nos. 4,080,173 and 4,228,130 that relate to self-condensing products of polyhydric phenols; and Canadian Patent 1,181,899 (equivalent to Japanese application JP-54-107991), which deals with the use of phenol-formaldehyde resins with a modifier such as resorcinol, hydroquinone or bisphenol A.

This summary of the state of the art shows the extensive variety of compounds and methods used in the area of polymerization reactor coating. However, new materials and procedures which effectively diminish the formation of scales are disclosed and claimed herein.

DETAILED DESCRIPTION

The invention relates to the application of a coating solution for inhibiting the formation of scale on polymerization reactor inner surfaces, wherein the solution contains the following chemical species:

a) a linear or branched oligomer compound belonging to the families of a poly(hydroxybenzyl) compound, a poly(hydroxybenzylether) compound, or their copolymers or blends. The concentration of the compound varies between 0.01–10% by weight. The compound has the following structure:

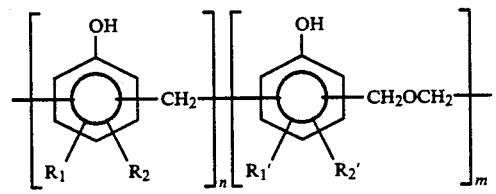

with $0 \leq (n+m) \leq 50$, preferably between 10–30 while n and m may each be between 5–15, where $R_1$, $R_1'$, $R_2$ and $R_2'$ are a halogen, a hydrogen, a substituted benzyl, an aryl, an alkane of up to 8 carbon atoms, an alcohol of up to 4 carbon atoms, an ester of up to 8 carbon atoms, an acid or aldehyde, or a polyoxymethylene oligomer in any combination;

b) an alkali metal hydroxide, such as NaOH, KOH or LiOH, at a concentration of between about 0.01 and 10% by weight; and c) an electrolyte, such as NaCl, KCl, $NaNO_3$, $KNO_3$ or $NH_4NO_3$, at a concentration of between about 0.001 and 10% by weight.

The combination of these chemical species (all of them being commercially available) takes place in an aqueous medium at room temperature. The poly(hydroxy benzyl) and poly(hydroxybenzylether) compounds are commercially available as complex mixtures (e.g., from American Cyanamid, Formica Limited) and are classified under the generic name of phenol-formaldehyde resins.

The coating resulting from applying this solution to the inner surfaces of polymerization reactors shows at room temperature a surface tension greater than 72 dynes/cm and a contact angle with water of about zero. These parameters are very important in coating technology since the tendency of a liquid to spread over a solid surface depends essentially on these two quantities. The resulting layer is quite thin (less than 0.5 mm) and colorless, the micrometric thickness of the layer allows easy heat exchange between the reaction medium and the temperature control system, and the transparency of the coating indicates that it does not color the polymer.

This scale inhibiting solution, when applied on the internal surfaces of the polymerization reactor, has the effect of reducing almost completely the accumulation of polymeric material on the reactor walls and stirring devices without affecting the rate of the reaction, even in the case when the excess of solution from the coated surface has not been removed.

The surfaces to be coated must be clean in order to optimize the coating effect of the solution, but it is not necessary to carry out an abrasive treatment previous to the application of this solution.

Also, it has been found that the scale-inhibiting efficiency of the invention does not vary significantly when it is applied with or without previous thermal conditioning of the materials to be coated and/or of the solution itself. Also, the solution can be prepared and stored over long periods (<1 year, no antioxidants added) with little change in its scale inhibiting efficiency.

The quality of the coating does not seem to be affected when the pH of the reaction medium is between 3 and 12, this is particularly relevant since this last parameter may change during or between batches.

Among the variety of processes used in the polymer industry two of them are the batch and the closed reactor processes—see EXAMPLES—. In the case of the batch process, the application of the scale inhibiting solution can be done manually or mechanically (with a spray gun, for example) with the advantage that it does not require the heating of the reactor walls once the solution has been applied. In the case of a closed reactor process, the coating solution can be applied mechanically (for instance, using a water sprayer) or alternatively by means of steam water. It is not required to dry the walls of the reactor in order to continue producing polymer. This characteristic is of utmost importance in the case of closed reactors, as the drying process (conceivably performed by heating the interior of the reactor) could require an additional down-time.

For room temperature application of the coating, the solution is simply spread over all internal surfaces of the reactor and the mixing elements. Alternatively, the coating may be applied by means of steam injection. In this method, a device, such as a spraying gun, is used to wet such surfaces with water vapor and then the coating is applied by means of steam. The steam temperature ranges from about 100° to 200° C., and the treatment time ranges from about 30 seconds to 3 minutes and preferably about 1-2 minutes. The coating is applied as evenly as possible over the surfaces by this treatment.

The application of the solutions of the invention provide advantages over the prior art in that it is not necessary to preheat the surfaces to be coated, and it is also not necessary to either rinse excess solution from the coated surfaces or to drain such excess solution from the reactor prior to conducting the polymerization reaction.

Once the scale inhibiting solution has been applied to the surfaces of interest, the operational directions for production of the desired polymer can be followed at once, with the accompanying benefit of decreasing the down-time periods due to the feasibility of automatic application of the coating material as soon as the reactor has been emptied, and the convenience of not having to dry and/or to heat treat the coating, previous to the reaction process itself.

The examples given below are based upon experiments on the production of polyvinylchloride in suspension and are merely of an illustrative nature. It must be understood that the coating described herein is equally applicable to the processes of polymerization and copolymerization of a wide variety of substituted ethylene monomers when such processes are performed in suspension, dispersion, microsuspension, or emulsion. The polymerized monomers can be of the following type: a) vinyl, such as vinyl halides (e.g., vinyl chloride or vinyl bromide), b) vinylidenes, such as vinylidene halides (e.g. vinylidene chloride and vinylidene bromide), c) vinylesters, such as acrylic acid esters [$H_2C=CHCOOC_mH_{(2m+1)}$ with m=1-8], d) acrylonitriles, such as acrylonitrile and methyl acrylonitrile, e) methacrylates, such as alkylesters of methacrylic acid [$H_2C=C(CH_3)COOC_mH_{(2m+1)}$ with m=1-8], f) vinylaromatics, such as styrene, α-methylstyrene, vinyltoluene and vinylnaphtalene, and g) diolefins of the butadiene type, isoprene and chloroprene.

Several types of oligomers belonging to the families of both the poly(hydroxybenzyl) and poly(hydroxybenzylether) compounds have been tested, and excellent properties for inhibiting the formation of polymer scale on the inner surfaces of the reactor have been found.

EXAMPLE 1

The walls and stirring equipment of the reaction vessel were mechanically cleaned. Some solutions were prepared for which the mass ratio of poly(hydroxybenzyl) compound (slightly branched; substitution degree of the aromatic ring approximately equal to 2.2) to NaOH was 1:3. Several experiments were carried out with the molecular weight of the poly(hydroxybenzyl) compound ranging between 1,000 to 3,000 g/mol, with a hydroxide number of between 1.2 and 5.0 for every 100 grams of compound; and where the ionic strength of the medium was adjusted using an electrolyte, such as NaCl, KCl, NaNO$_3$, KNO$_3$ or NH$_4$NO$_3$ at a concentration of between 0.001 to 10%. The solution was sprayed over all the parts of the system which are contacted with the reaction medium. Then, the excess of solution was rinsed, the reactor was drained and the synthesis of the polymer was started at once. The polymerization of vinylchloride monomer (VCM), was performed with a ratio of monomer to water of 1:1.7. Hydroxypropyl methyl cellulose (HPMC) at a concentration of 0.54 (grams per liter of H$_2$O or poly(vinyl alcohol) at 0.003 to 0.05% by weight of VCM) was used as the suspension agent, with lauryl peroxide selected as the initiator. The maximum temperature of the reaction was 60° C. The resulting polymer had a K value of 67 in cyclohexanone at 30° C.

The quality control analyses of the polymer (porosity, distribution of particles size, etc.), showed that there was no significant difference with polyvinylchloride prepared using a control procedure (no coating), and particularly, the properties of the final product were not affected. Experiments were also carried out which involved leaving an excess of scale inhibiting solution on the surfaces, with similar results. After reaction the coated surfaces that were in contact with the reaction medium presented an aspect which could be classified as: a) smooth (absence of scaled polymer) and b) powdery (presence of a fine powder which was easily removable). The control procedure (no coating) yielded heavy scaling on most parts of the reactor. The condition of these surfaces is summarized in Table I below.

TABLE I

| CONDITION OF THE SURFACES OF THE REACTION VESSEL AFTER THE SYNTHESIS OF PVE (*) | | |
|---|---|---|
| | CLASSIFICATION | |
| PARTS | NO COATING | WITH COATING* |
| UPPER CAP | HEAVY | SMOOTH |
| CYLINDRICAL PART | HEAVY | POWDERY |
| STIRRER | HEAVY | SMOOTH |

(*) In the areas were residues of polymer were found the layers which contained them were very thin (less than 0.5 mm) and the ratio covered area to total are ≦0.5%.

EXAMPLE 2

In the present case a follow-up was made of the performance of the product of Example 1 for several reactions. After each reaction the coating was renewed, the surfaces were rinsed and the reactor was drained to proceed with another polymer synthesis. The quality of the synthesized polymer remained constant (for all practical purposes) during that train of experiments.

EXAMPLE 3

In order to determine the chemical inertness of the scale inhibiting solution toward atmospheric oxygen during long storage periods (≦1 year), trials were run in which samples were removed at monthly intervals from a solution kept at room temperature in a glass container. The preparation of the mother solution, the application of each aged solution, and the polymerization procedure were all as described in Example 1. In each case, the results obtained were similar to those of Table I.

EXAMPLE 4

This experiment studied the dependence of the coating performance of the invention upon the degree of oxidation of the methylol groups and/or the presence of significant amounts of —COOH and —COH groups. The compound of Example 1 was added together with KMnO$_4$, KOH and water in a reaction vessel in a relation 0.10:0.05:0.05:100, respectively. The mixture was then refluxed for approximately two hours. The reaction product contained a substantial proportion of acid and aldehyde groups, which was verified spectroscopically. The preparation and application of the scale inhibiting solution and the execution of the polymer synthesis were made in a manner analogous to that described in Example 1. The results were similar to those indicated in Table I.

EXAMPLE 5

In a set of experiments made in order to determine the influence of acidity of the medium over the scale inhibiting ability of the invention, several polymerization reactions of vinyl chloride monomer like in Example 1 were performed varying the pH of the reaction medium between 3 and 12, using for that purpose different types of buffer systems (for example, mixtures of phosphoric acid and phosphate salts). In each case similar results were obtained to those of Table 1.

EXAMPLE 6

A solution was prepared with a mass ratio of poly(hydroxybenzylether) compound (moderately trisubstituted, having an average degree of substitution of the aromatic ring approximately equal to 2.4) to NaOH was 2:1. The application of this scale inhibiting solution and the execution of the polymer synthesis were made in a manner analogous to that described in Example 1. The results were similar to those described in Table I.

EXAMPLE 7

A solution was prepared containing potassium hydroxide and a branched oligomer of a poly(hydroxybenzylether) compound in a 1:2 mass ratio. The reactor's inner surfaces were then treated with a steam water spray and then the coating was applied by means of water vapor. Once finished with the wetting of all inner parts of the reaction vessel, a reaction was performed where the ratio of VCM to water was 1:2, the suspension agent was hydroxypropyl methyl cellulose or poly(vinyl alcohol), and the initiator was lauryl peroxide. The properties of the polymer, i.e, K-value, porosity, particle size distribution and appearance, were the same as to those obtained in a control experiment. The condition of the reactor and of its stirring devices were essentially equal to those described in Table I of Example 1.

EXAMPLE 8

A solution was prepared containing a 2:3 mass ratio of sodium hydroxide and a chlorinated poly(hydroxybenzyl) compound (chlorine content of 9% by weight). The application of the scale inhibiting solution and the protocol for the synthesis of the polymer were carried out in a manner analogous to that described in Example 1. The results were similar to those indicated in Table I.

EXAMPLE 9

A solution was prepared containing sodium hydroxide and a linear poly(hydroxymethylbenzyl) compound in a mass ratio of 3:5. The average molecular weight of the poly(hydroxymethylbenzyl) compound was 2,700 g/mol. The resulting solution was applied and the synthesis was performed according to what has been described in Example 1. The results were similar to those indicated in Table 1.

EXAMPLE 10

The steam applied vapor technique was used for the poly(hydroxybenzyl) compound of Example 1. More than 100 pilot plant VCM reactions (and several hundred at industrial reactors) have been completed with total success (i.e.—no effect on polymerization rate or resin color) with longer service life before scale-buildup would have to be removed by water blasting. Compared to a commercial product available from B. F. Goodrich the steam applied vapor technique of the present invention using the poly(hydroxybenzyl) compound of Example 1 provides about 2.5 times as many consecutive polymerization reactions before water blasting is necessary to remove scale buildup.

We claim:

1. A process for preventing or substantially reducing the formation of scale on the inner surfaces of a polymerization reactor which comprises coating the inner surfaces of the reactor with an aqueous alkali metal hydroxide solution containing a) an electrolyte of an alkali metal halide and b) a linear or branched oligomer of a poly(hydroxybenzyl) compound, a poly(hydroxybenzylether) compound, or a copolymer or blend thereof having the following chemical structure:

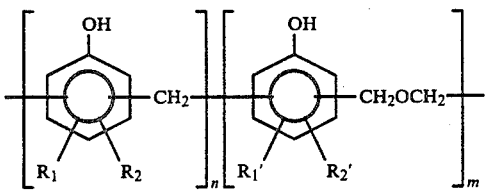

wherein $0 \leq (n+m) \leq 50$ and wherein R1, R1', R2 and R2' are each, a hydrogen, a substituted benzyl, an aryl, an alkane of up to 8 carbon atoms, an alcohol of up to 4 carbon atoms, an ester of up to 8 carbon atoms, an acid or aldehyde, a polyoxymethylene oligomer, or a combination thereof.

2. The process of claim 1 wherein the concentration of the oligomer is between about 0.01 and 10% by weight of the solution.

3. The process of claim 1 which further comprises conducting a polymerization reaction of a substituted ethylene polymer selected from among a) vinyls or vinyl halides, b) vinylidenes or vinylidene halides, c) vinylesters, d) acrylonitriles, e) methacrylates, f) vinylaromatics, and g) diolefins of butadiene isoprene or chloroprene in the reactor after the coating is applied.

4. The process of claim 3 wherein the polymerization reaction takes place in suspension, microsuspension, dispersion, or emulsion.

5. The process of claim 3 wherein the maximum temperature of the polymerization reaction lies between 0° to 120° C.

6. The process of claim 3 wherein vinylchloride monomer is polymerized in suspension.

7. The process of claim 1 wherein the alkali metal hydroxide is NaOH, KOH or LiOH and is present in the solution at a concentration of about 0.01 to 10% by weight.

8. The process of claim 1 wherein the electrolyte is NaCl, KCl, NaNO$_3$ or NH$_4$NO$_3$ and is present in the solution at a concentration of about 0.01 to 10% by weight.

9. The process of claim 1 which further comprises applying less than 0.5 mm of a coating having a surface tension of greater than 72 dynes/cm and a contact angle with water of about zero.

10. The process of claim 1 which further comprises maintaining the surfaces of the reactor to be coated at a temperature of between 20° and 100° C.

11. The process of claim 1 which further comprises applying the coating to the reactor inner surfaces by steam water.

12. The process of claim 1 wherein R1, R1', R2 and R2' are each hydrogen.

13. A process for preventing or substantially reducing the formation of scale on the inner surfaces of a polymerization reactor which comprises coating the inner surfaces of the reactor with an aqueous solution containing an alkali metal hydroxide in an amount of about 0.01 to 10% by weight of the solution, an electrolyte of an alkali metal halide in an amount of about 0.01 to 10% by weight of the solution and an oligomer of a poly(hydroxybenzyl) compound, a poly(hydroxybenzylether) compound, or a copolymer or blend thereof having the following chemical structure:

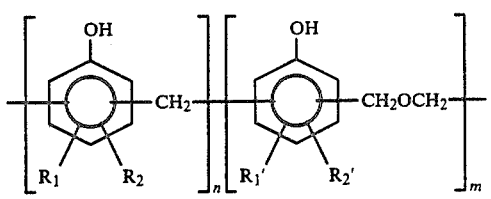

wherein $0 \leq (n+m) \leq 50$ and wherein R1, R1', R2 and R2' are each a halogen, a hydrogen, a substituted benzyl, an aryl, an alkane of up to 8 carbon atoms, an alcohol of up to 4 carbon atoms, an ester of up to 8 carbon atoms, an acid or aldehyde, a polyoxymethylene oligomer, or a combination thereof, in an amount of between about 0.01 and 10% by weight of the solution, wherein the coating is applied by steam injection.

14. The process of claim 13 wherein the alkali metal hydroxide is NaOH, KOH or LiOH.

15. The process of claim 13 wherein the electrolyte is NaCl, KCl, NaNO$_3$ or NH$_4$NO$_3$.

16. The process of claim 13 which further comprises maintaining the surfaces of the reactor to be coated at a temperature of between 20° and 100° C.

17. A process for preventing or substantially reducing the formation of scale on the inner surfaces of a polymerization reactor which comprises coating the inner surfaces of the reactor with an aqueous solution containing an alkali metal hydroxide in an amount of about 0.01 to 10% by weight of the solution, an electrolyte of an alkali metal halide in an amount of about 0.01% to 10% by weight of the solution and a linear or branched oligomer of a poly(hydroxybenzyl) compound, a poly(hydroxybenzylether) compound, or a copolymer or blend thereof having the following chemical structure:

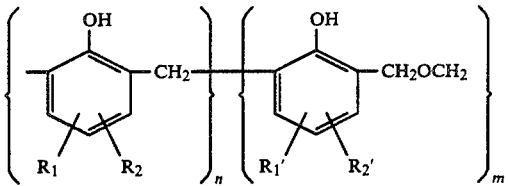

wherein $0 \leq (n+m) \leq 50$ and wherein R$_1$, R$_1'$, R$_2$ and R$_2'$ are each hydrogen.

18. The process of claim 17 wherein the alkali metal hydroxide is NaOH, KOH or LiOH.

19. The process of claim 17 wherein the electrolyte is NaCl, KCl, NaNO$_3$ or NH$_4$NO$_3$.

20. The process of claim 17 which further comprises maintaining the surfaces of the reactor to be coated at a temperature of between 20° to 100° C.

* * * * *